(12) United States Patent
Vinokur et al.

(10) Patent No.: US 10,874,061 B1
(45) Date of Patent: Dec. 29, 2020

(54) DRIP IRRIGATION SYSTEM

(71) Applicant: Gaia Drip Ltd., Kfar Sava (IL)

(72) Inventors: Ori Vinokur, Kfar Sava (IL); Lior Bachar, Hod Hasharon (IL); Ariel Yarnitsky, Givat Shmuel (IL); Dan Alon, Herzliya (IL); Eliezer Vinokur, Herzliya (IL)

(73) Assignee: Gaia Drip Ltd., Kfar Sava (IL)

( * ) Notice: Subject to any disclaimer, the term of this patent is extended or adjusted under 35 U.S.C. 154(b) by 0 days.

(21) Appl. No.: 16/731,309

(22) Filed: Dec. 31, 2019

(51) Int. Cl.
*A01G 25/16* (2006.01)
*A01G 25/02* (2006.01)

(52) U.S. Cl.
CPC ........... *A01G 25/16* (2013.01); *A01G 25/023* (2013.01)

(58) Field of Classification Search
CPC .... A01G 25/023; A01G 25/16; A01G 25/162; Y10T 137/379
See application file for complete search history.

(56) References Cited

U.S. PATENT DOCUMENTS

| | | | | |
|---|---|---|---|---|
| 3,518,831 A * | 7/1970 | Miosek | ................ | A01G 25/06 405/37 |
| 3,685,735 A * | 8/1972 | Foster | ................ | A01G 25/023 239/109 |
| 3,762,170 A * | 10/1973 | Fitzhugh | ............. | A01G 25/023 405/38 |
| 3,876,155 A * | 4/1975 | Ruben | ................ | A01G 25/023 239/542 |
| 3,909,975 A * | 10/1975 | Basile | ................ | A01M 1/245 43/124 |
| 3,917,174 A * | 11/1975 | Hildebrandt | ......... | A01G 25/023 239/542 |
| 4,015,366 A * | 4/1977 | Hall, III | ............... | A01D 46/005 47/1.43 |
| 6,792,962 B1 * | 9/2004 | Smith | ..................... | F16K 15/08 137/12 |
| 8,494,682 B2 * | 7/2013 | Elmer | ................... | B05B 12/008 239/11 |
| 9,149,011 B2 * | 10/2015 | Hamann | .............. | A01G 25/023 |
| 2005/0171646 A1 * | 8/2005 | Miller | .................... | A01G 25/16 700/284 |
| 2005/0279856 A1 * | 12/2005 | Nalbandian | ............ | A01G 25/02 239/76 |
| 2014/0252103 A1 * | 9/2014 | Hamann | .............. | A01G 25/165 239/1 |

* cited by examiner

*Primary Examiner* — Jessica Cahill
(74) *Attorney, Agent, or Firm* — Dekel Patent Ltd.; David Klein (57) ABSTRACT

A method for drip irrigation includes providing water from a first main line to at least one feeder line. The at least one feeder line extends along a plurality of segments in a field, including a first end segment nearest the first main line and an adjacent segment which is adjacent to the first end segment further away from the main line. At least one dripper is disposed on the at least one feeder line for each of the segments. Water is delivered by a first pressure from the first main line to the first end segment, the first pressure being insufficient to deliver water from the first main line to the adjacent segment. Water is delivered by a second pressure from the first main line to the first end segment and to the adjacent segment, the second pressure being greater than the first pressure.

17 Claims, 11 Drawing Sheets

| Component Type | INVENTION | PRIOR ART |
|---|---|---|
| Cronus - Variable Pressure Regulator & Valve | 0.33-2 | - |
| Solenoid Valve | - | 6 |
| Extra Tubing (m) | - | 180 |
| Power & Communication Cable (m) | 35 | 185 |
| Check Valves | - | 6 |
| Connectors | - | 24 |
| T - Connectors | - | 12 |
| LPOV* (Optional) | 6 | - |

DRIP IRRIGATION SYSTEM

FIELD OF THE INVENTION

The present invention relates generally to drip irrigation, and particularly to a pressure-actuated drip irrigation system.

BACKGROUND OF THE INVENTION

Throughout the disclosure and claims, the term "drip irrigation" encompasses any kind of micro-irrigation, including drip irrigation, localized irrigation, low-volume irrigation, low-flow irrigation, trickle irrigation, and others.

In drip irrigation, a small amount of water is delivered as required to the root areas of plants and trees, confining the water supplied substantially to such root areas. Some advantages include, but are not limited to, efficient water use, water savings, using the same water for higher quality crops, lower variability of crops, better suitability for many weather conditions, better use of chemigation and more. Besides these advantages, equipment and power requirements can be kept to a minimum. A drip irrigation system generally includes a main line (pipe, tube and the like) connected to a supply of water under pressure and a plurality of feeder lines (pipes, tubes and the like) for conveying water from the main line to rows of crops or trees. Tapped into each feeder line are emitters (this term encompassing emitters, drippers, sprinklers, foggers and others) for supplying water to specific plant root areas.

Problems that are difficult to overcome in drip irrigation include the differences in soil and other agricultural features from one part of the field to another and/or climatic differences that affect the amount of irrigation, fertilization, chemigation, pesticides, etc. needed over the different areas of the field. This poses a problem of providing the correct solution for a particular area in the field as opposed to a different area.

SUMMARY OF THE INVENTION

The present invention seeks to provide a novel irrigation system, as is described more in detail hereinbelow.

The system is significantly less expensive with much less components and tubing than prior art systems, while at the same time providing benefits to the farmer. The system can provide improved water efficiency, such as better use of the same amount of water to achieve better crops and/or using less water, improved crop yield, improved crop quality, reduced variability and greater uniformity of crops (making sure each plant gets exactly what it needs), eliminating or reducing dependency on weather conditions and efficient chemigation.

The system is simple to assemble, flexible, modular and easy to maintain and operate. The system uses water hydrodynamics and dynamic algorithms to irrigate each segment, as opposed to using individual segment actuators. The system may be integrated with different dripline types and operating platforms, and thus achieving greater uniformity, such as but not limited to, power and communications, API (application program interface), irrigation, fertigation, pesticidation and many more.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
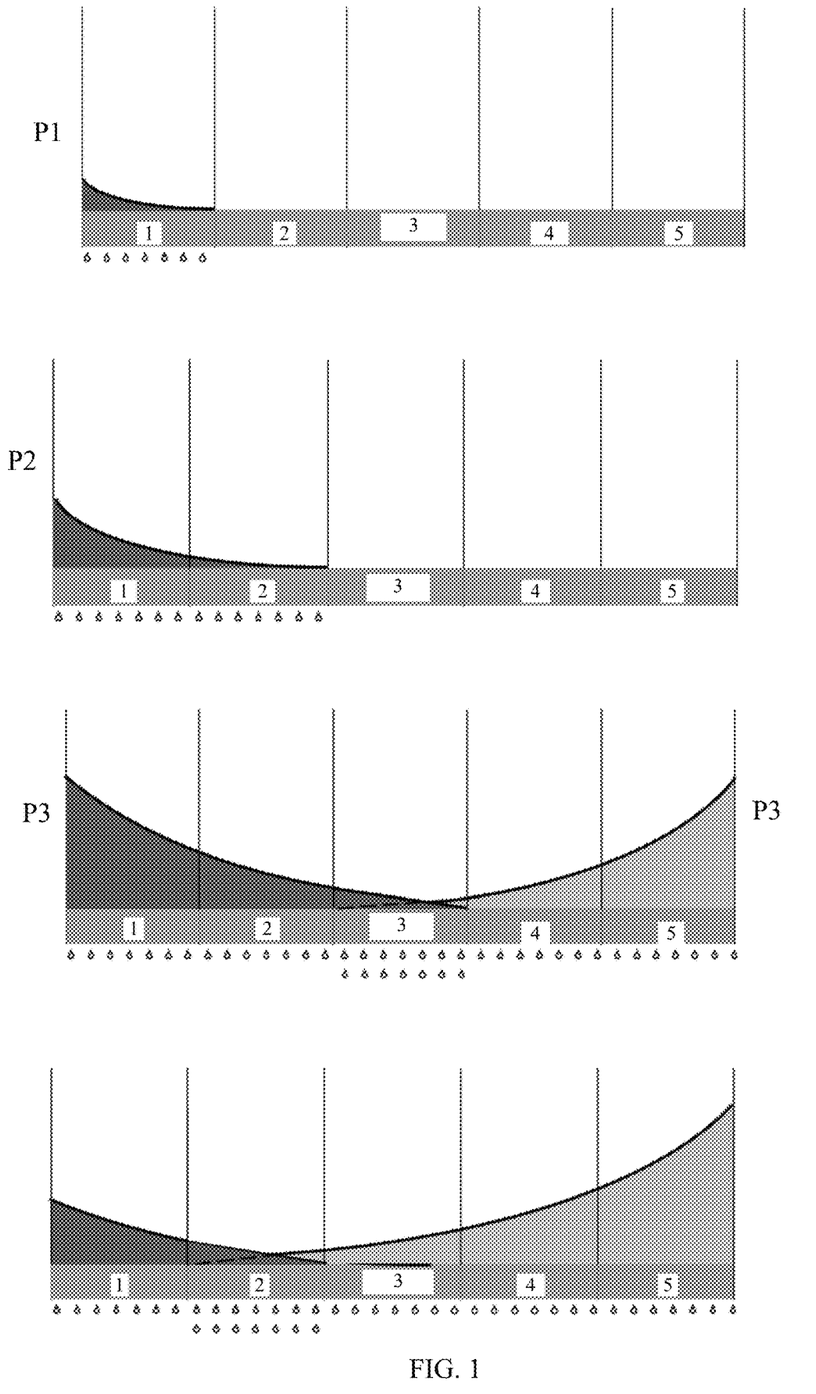
FIG. 1 is a simplified graphical illustration of the relation between liquid pressure (y-axis) and the amount of segments in a field (x-axis) that the drip irrigation system can irrigate, in accordance with a non-limiting embodiment of the present invention.
Figure 2:
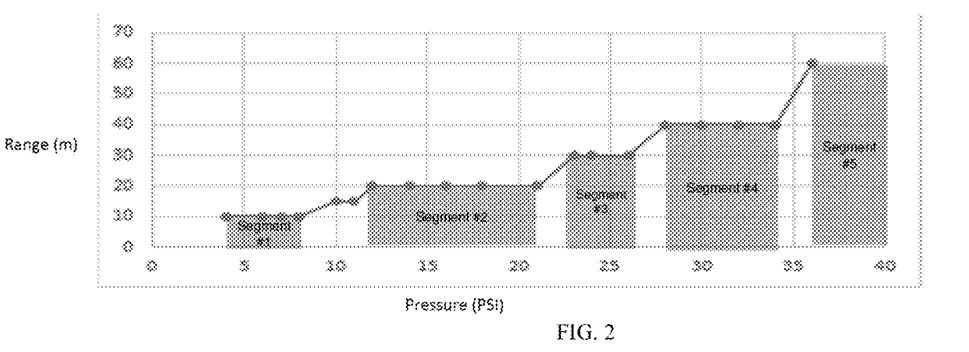
FIG. 2 is a simplified graphical illustration of the relation between liquid pressure (x-axis) and the range in length in a field (distance to the segment) (y-axis) that the drip irrigation system can irrigate, in accordance with a non-limiting embodiment of the present invention.

The present invention uses pressurized liquid from a main line to supply liquid to feeder lines in segments (pixels) of a field to be irrigated. It is noted that the invention may be used for delivering any fluid for agricultural use, liquid or gas. The description will be given hereinbelow for liquids, such as water. The terms "fluid", "liquid" and "water" are used interchangeably throughout and encompass any agricultural liquid or gas for plant life, such as but not limited to, water, fertilizers, nutrients, pesticides, and others. The basic idea of using pressure to irrigate field segments is shown in FIGS. 1 and 2. The terms "feeder line", "irrigation line" and "drip line" are used interchangeably throughout.

Reference is now made to FIG. 1, which illustrates the relation between liquid pressure (y-axis) and the amount of segments in the field (x-axis) that the drip irrigation system can irrigate. For example, water flowing at pressure P1 from just the left (left main line) may be sufficient to irrigate just one segment in a given feeder line (upper graph); increasing the pressure to pressure P2 may be sufficient to irrigate two segments (next graph). As seen in the third graph, if two water main lines are used at pressure P3, one at each end of the feeder line, then the middle segment (segment #3 in this non-limiting example) can receive double the amount of water, as opposed to just one main line, because the middle segment gets the overlap from the opposing main lines. In the fourth graph, the second segment receives double the amount of water, due to the higher pressure at the right main line and the lower pressure at the left main line. Of course, these are merely examples of the many possibilities possible with the invention.

In this manner, the system dynamically manipulates water pressure within the drip line (e.g., the drip line may include no-drain pipes or lateral pressure operated valves which are explained below) to generate dripping in specific segments of the drip line. Increasing pressure reaches more segments.

Reference is now made to FIG. 2, which illustrates the relation between liquid pressure (x-axis) and the range in length in the field, that is, the distance to the segment (y-axis) that the drip irrigation system can irrigate. In a typical feeder line, using about 4-7 PSI reaches a distance of up to 10 m; 12-21 PSI reaches up to 20 m, 22-26 PSI reaches up to 30 m; 28-34 PSI reaches up to 40 m; and 36-40 PSI reaches up to 60 m.

In this manner, the system can deliver the exact pressure combination for the optimal period of time to reach the desired irrigation for the particular segment. This eliminates the need for multiple actuators, extra tubing and components.

Figure 3:
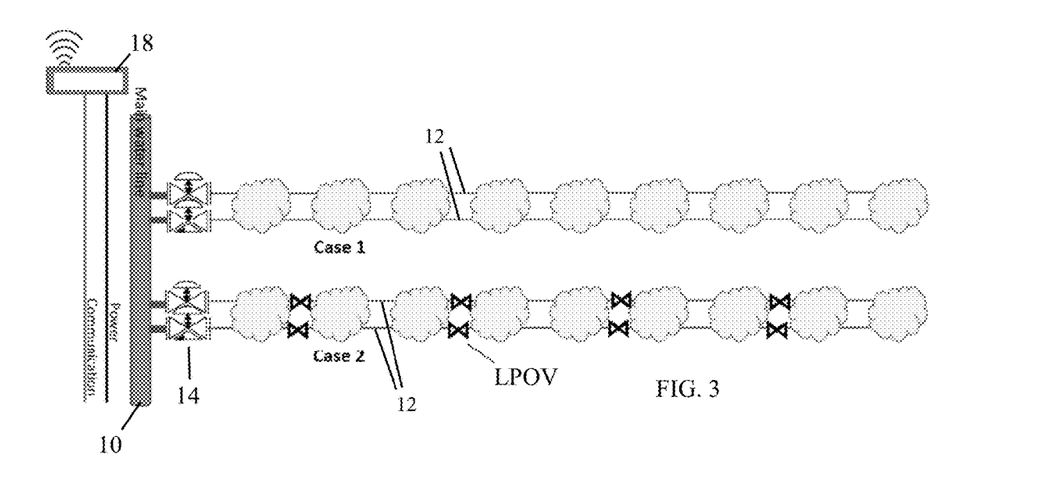
FIG. 3 is a simplified pictorial illustration of the drip irrigation system including a main water line, pressure controllers and irrigation lines, in accordance with two non-limiting embodiments of the present invention.

Reference is now made to FIG. 3, which illustrates two different versions of a drip irrigation system of the invention.

The system may include a main line 10 which delivers water to feeder lines 12 by means of one or more flow controllers 14 that may include one or more valves, pressure sensors or other sensors for feedback control, as is described below. The system is controlled by a controller 18, which in the illustrated embodiment is a gateway control system (an example is described below with reference to FIG. 6), but other controllers may also be used (either local or remote, such as by communication to a cloud). The flow controller 14 includes, without limitation, a controllable pressure regulator, controllable valve, feedback components and other components (examples of which are shown in FIGS. 7A-7B), which may be controlled by controller 18. Thus, the system includes appropriate flow/pressure sensors and one or more controllers to regulate the flow, using feedback between the controller and the sensors. The system can thus monitor if there are turbulences or other disturbances or changes in the flow or throughput, for example, and take appropriate action to maintain the desired water delivery.

Non-limiting examples of hydrodynamic closed-loop feedback include feedback by sensing water pressure variance or flow variance when the segment is opened or closed; feedback by sensing water flow changes to detect if a segment is fully open.

The feed lines 12 include drippers 20 (seen in FIG. 10), which may be constant pressure or pressure control drippers, such as but not limited to, in-line or on-line drippers, CNL drippers or others. The dripper may be a dripper that closes (shuts off water flow) if pressure increases above a high pressure threshold. In this manner, instead of a segment being irrigated upon reaching a certain pressure, alternatively, a segment can be shut off from irrigation if a high pressure threshold is reached. As seen in the lower portion of FIG. 3, in another option, lateral pressure operated valves 22 may be used for each segment, such as when using compensated drip lines. The term "lateral pressure operated valve" (LPOV) encompasses any kind of pressure operated valve used in the drip line, such as but not limited to, pressure-compensated valves, leakage prevention devices and others. In the present disclosure, as opposed to the prior art, the lateral pressure operated valve may be unidirectional or bi-directional, as is described below.

It is noted, without limitation, that when not using LPOVs, the definition of what is called a segment may be dynamically decided according to the need at any time; when using LPOVs, the segment definition can be changed by simply moving the valves in the field.

Figure 4:
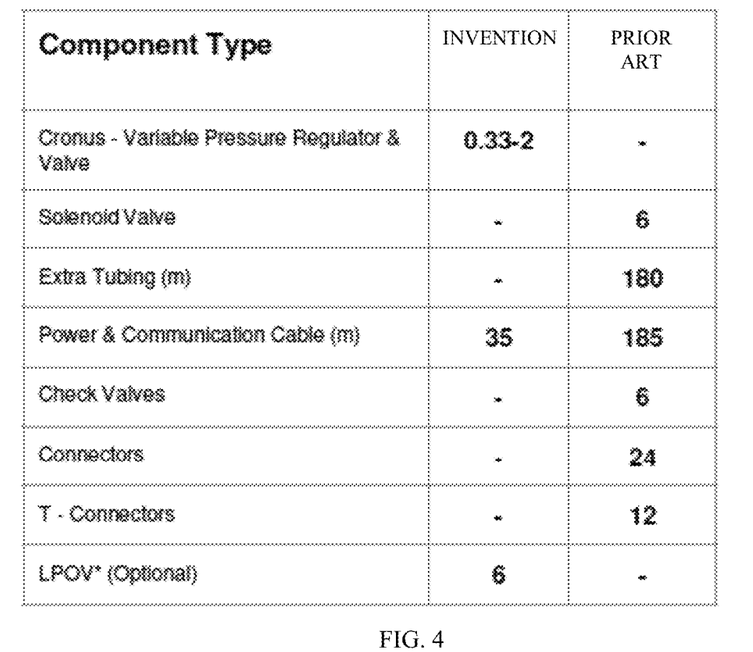
FIG. 4 is a table that compares the number of components in the drip irrigation system of an embodiment of the invention versus the number of components in a prior art drip irrigation system.

Reference is now made to FIG. 4. As seen in the table of FIG. 4, the system is much more affordable than prior art systems, yet achieves comparable results. The system greatly reduces the number of components, and uses pressure instead of segment actuators, thereby avoiding the need for extra pipes and actuators. There is no need for independent segment loops or specific dripper lines for each segment, as in the prior art. The power and communications lines need to be coupled only to the main water line and there is no need for control elements for each segment.

Figure 5:
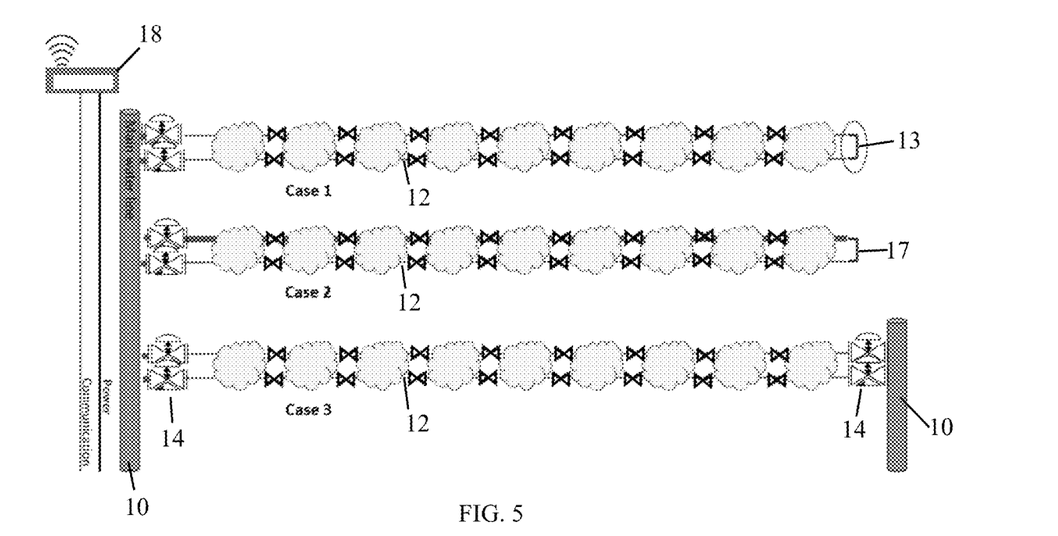
FIG. 5 is a simplified pictorial illustration of the drip irrigation system including a main water line, pressure controllers and irrigation lines, in accordance with three non-limiting embodiments of the present invention.

Reference is now made to FIG. 5, which illustrates the drip irrigation system, in accordance with three non-limiting embodiments of the present invention. In the top portion of the figure, the two feeder lines 12 have blind or dead ends 13 (right side of the figure). This achieves maximum pressure at the segments near the dead ends 13. In the middle portion of the figure, the two feeder lines 12 are connected to each other in series by a coupling line 17 so that the water flows from the main line 10 to the end of one feeder line 12 and then returns in the opposite direction in the other feeder line 12. This enables adjusting pressures and distances from both sides of the feeder line to achieve an optimal irrigation of the plants in the line. In the lower portion of the figure, there is another main line 10 at the end of the feeder lines 12, with one or more controllable flow controllers 14. This increases the possibilities of irrigation for the inner segments as mentioned above.

Figure 6:
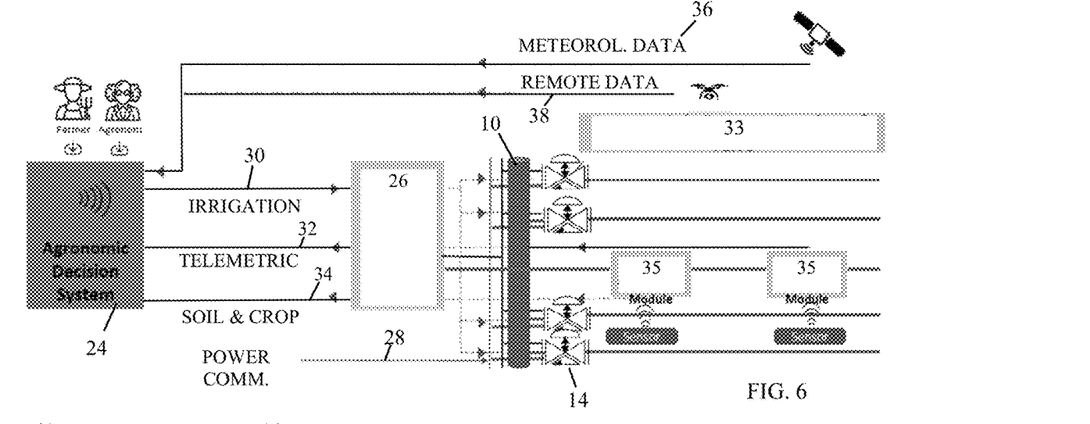
FIG. 6 is a simplified pictorial illustration of the drip irrigation system integrated with an agronomic decision system, in accordance with a non-limiting embodiment of the present invention.
Figure 7A:
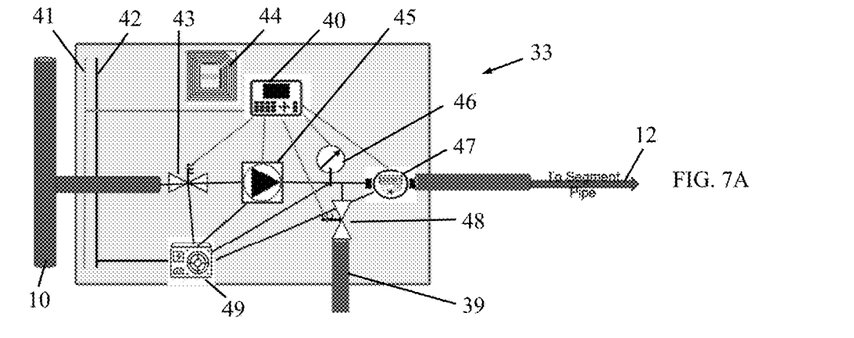
FIGS. 7A and 7B are two simplified pictorial illustrations of controlled field pressure regulators used in the drip irrigation system, in accordance with non-limiting embodiments of the present invention.
Figure 7B:
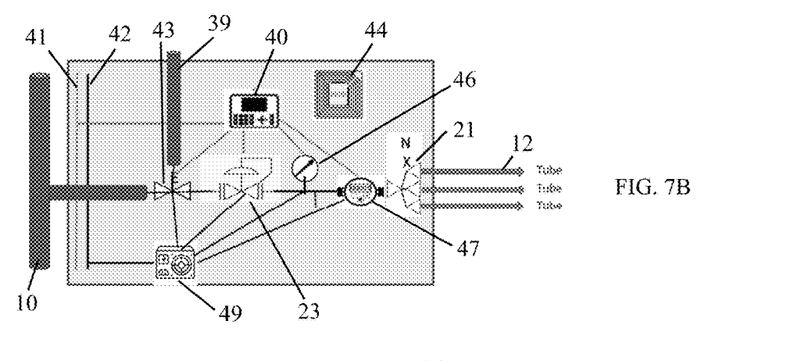

Reference is now made to FIG. 6, which illustrates the drip irrigation system integrated with an agronomic decision system 24, in accordance with a non-limiting embodiment of the present invention. Both the farmer and an agronomist are part of the decision making process of the agronomic decision system 24. The agronomic decision system 24 may be in communication with the main line 10 via a gateway communication module 26 (described below with reference to FIG. 8). Power and communication lines 28 may be coupled to the components used to operate the main line 10.

The agronomic decision system 24 may communicate different data to and from the gateway 26, such as but not limited to, a dynamic irrigation, fertigation or chemigation plan 30, telemetric data 32 (e.g., alerts) and soil and crop sensor data 34. The data from the sensors in the field may also be used for irrigation algorithms. The agronomic decision system 24 may receive different data, such as but not limited to, meteorological data 36 and remote sensing data 38. A pressure regulator and valve unit 33 may be provided for operating the flow of water from the main line to the feeder lines and is described below with reference to FIGS. 7A and 7B. Command modules 35 (described below with reference to FIG. 9) may be coupled between the main line 10 and each feeder line 12 (one or more command modules 35 may be used on one feeder line 12).

All of the different data may be used by the system to regulate the irrigation. For example, the irrigation and fertigation plan 30 may be used to determine a first plan, in which all segments of an almond grove get equal fertilization. The meteorological data 36 and remote sensing data 38 may be taken into account, for example, predicted rainfall (if rain is expected the system may shut off delivery of water for the duration of the rainfall); the telemetric data 32 may provide information regarding bee pollination which may affect the time and amount of drip irrigation, and the soil and crop sensor data 34 may provide information that changes the dynamic irrigation and fertigation plan 30 so that some segments get different amounts of irrigation water.

Accordingly, the system can translate an agronomic plan to pressure/time/controller commands to the pressure regulator of the system to precisely control the drip irrigation of the field, for any kind of emitter (low pressure operable valves (such as but not limited to, DNL (dripline non-leakage) emitters or LPD (leakage prevention device) emitters), continuous emitters and others). Adaptive algorithms may allow for fully or partial autonomous operation. The system irrigates each segment according to a pressure and time plan to provide accurate pressure management.

The system can control segment irrigation according to ascending and descending pressure patterns. The system provides fault and error sensing and warns of problems with the exact position of the problem, without the need for a GPS on each component (e.g., the RFID element knows the position of the elements in the feeder line). The system is adaptive to changes or leaks and may have a built-in self-test feature.

Water flow and turbulent patterns may be used as an indication of actual irrigation performance. The liquid feedback provides information about changes in patterns of flow throughput and pressure fluctuations. The feedback allows for autonomous operation, control and adaptive measures, among others.

Reference is now made to FIGS. 7A and 7B, which illustrate controlled field pressure regulators used in the pressure regulator and valve unit 33 of the drip irrigation system, in accordance with non-limiting embodiments of the present invention.

The controlled field pressure regulator includes a controller 40 coupled between the main line 10 and each feeder line 12. The controller 40 may be coupled (wired or wirelessly) to one or more communication lines 41, power lines 42, electric controlled water valves 43, RFID elements 44 for geographical coordinate positioning, electric controlled pumps 45, pressure sensors 46, flow meter 47, flushing valves 48, and power supplies 49. A flushing exit 39 may be provided for dumping the flushing water that flushes the unit and the feeder line. One of the differences between the configuration of FIG. 7A and that of FIG. 7B is that in FIG. 7B, instead of the pump, there is an electric controlled pressure regulator (with motor) 23, and there is no dedicated flushing valve, but instead the flushing function is done by the one or more electric controlled water valves 43, which may be one or more three-way valves. Another optional difference is that in FIG. 7B, there is an N-way solenoid valve 21 for directing the flow to the N number of feeder lines.

Figure 8:
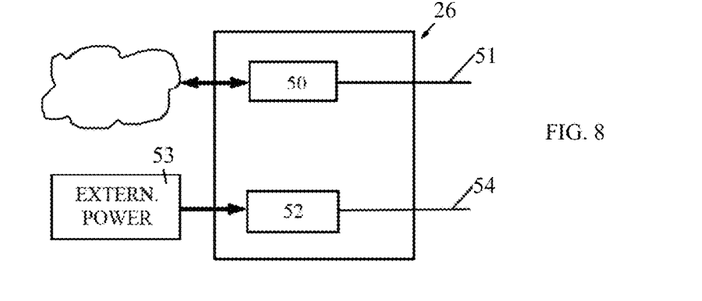
FIG. 8 is a simplified pictorial illustration of a farm or field gateway system used with the drip irrigation system, in accordance with a non-limiting embodiment of the present invention.

Reference is now made to FIG. 8, which illustrates a farm or field gateway system, (such as gateway communication module 26 of FIG. 6), used with the drip irrigation system, in accordance with a non-limiting embodiment of the present invention. The gateway system 26 may include a processor 50 in communication via a communication bus 51 with the components in the field, powered by a power supply 52, which may be energized by external power 53 via power lines 54 (or power line 64 of FIG. 9). Power line 54 may be the power line with which the gateway powers the whole field.

Figure 9:
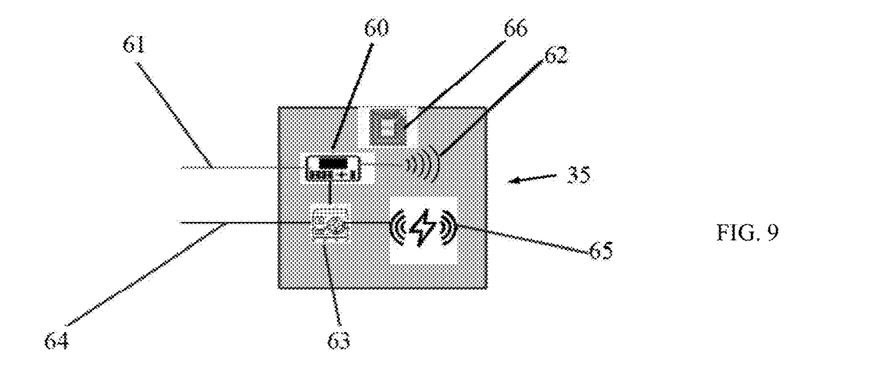
FIG. 9 is a simplified pictorial illustration of a field communication module used with the drip irrigation system, in accordance with non-limiting embodiments of the present invention.

Reference is now made to FIG. 9 is a simplified pictorial illustration of an example of the field communication module 35 used with the drip irrigation system, in accordance with non-limiting embodiments of the present invention.

The field communication module 35 may include a processor 60 in communication via a communication bus 61 with the gateway, such as via short range wireless communication (e.g., Bluetooth, Zigbee, etc.). A power supply 63, which may be energized by external power via power lines 64 or wirelessly, such as via short range wireless communication 65. Element 62 is an option used to provide wireless power to sensors in the field. The field communication module 35 may include an RFID element 66 for geographical positioning. For example, the RFID element provides a unique identifier for any component in the field and a GPS system may be used to provide the geographical position of that component, such that each component is identified with its spatial coordinates.

Figure 10:
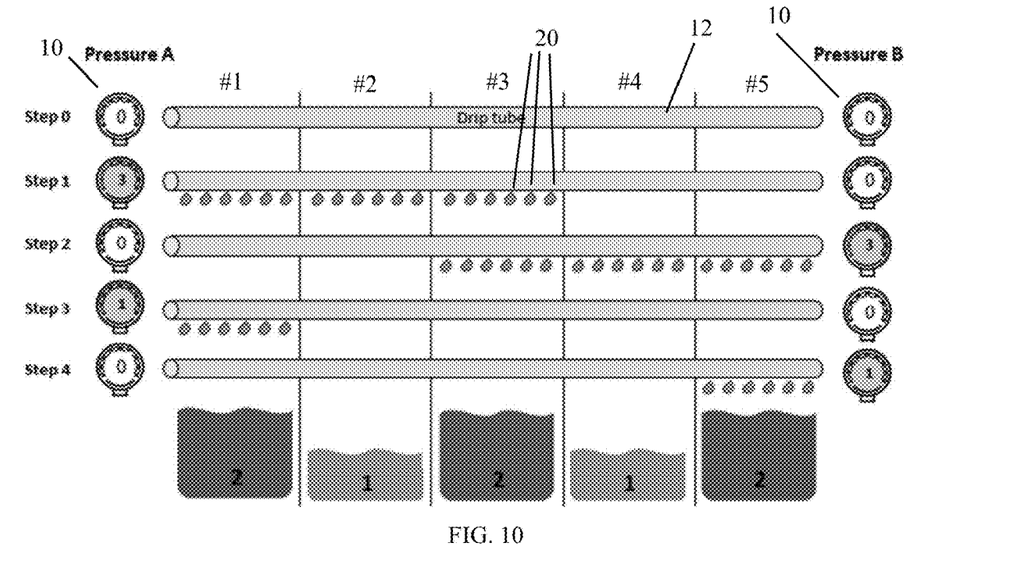
FIG. 10 is a simplified graphical illustration of the precision per segment that the drip irrigation system can irrigate, in accordance with a non-limiting embodiment of the present invention.

Reference is now made to FIG. 10, which illustrates the precision per segment that the drip irrigation system can irrigate with left and right main lines 10, in accordance with a non-limiting embodiment of the present invention. Initially (step 0), no flow is provided from either of the left or right main lines 10. At step 1, the left main line 10 is opened at a pressure of 3 units to provide water to segments #1, #2 and #3. In step 2, the right main line 10 is opened at a pressure of 3 units to provide water to segments #5, #4 and #3. At step 3, the left main line 10 is opened at a pressure of 1 unit to provide water to segment #1. At step 4, the right main line 10 is opened at a pressure of 1 unit to provide water to segment #5. In this manner, in total, segments #1, #3 and #5 receive double the amount of water of segments #2 and #4.

Figure 11:
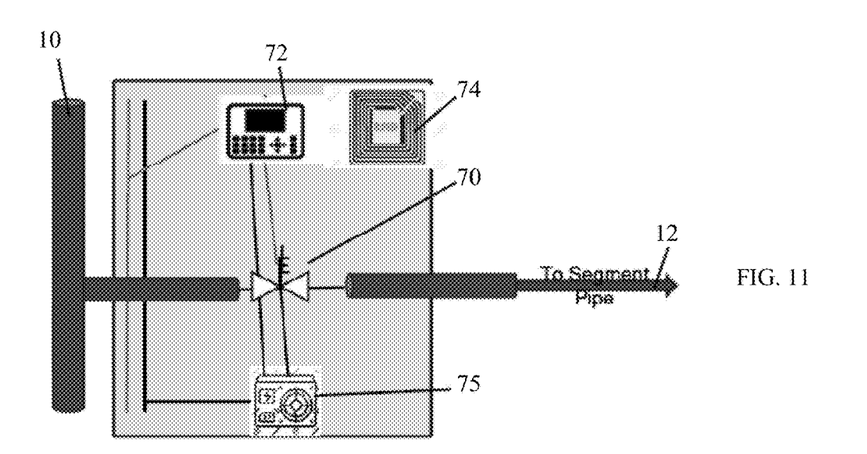
FIG. 11 is a simplified illustration of a lateral electronic controllable valve, used with the drip irrigation system, in accordance with a non-limiting embodiment of the present invention.

Reference is now made to FIG. 11, which illustrates a lateral electronic or hydraulic controllable valve 70, used with the drip irrigation system, in accordance with a non-limiting embodiment of the present invention.

The lateral electronic controllable valve 70 may be an electric controlled bidirectional water valve in communication with the main line 10, the feeder line 12, a controller 72, an RFID element 74 and a power supply 75. Valve 70 may be constructed of two lateral pressure operated valves that is opened at a specific pressure threshold, constant pressure threshold or manual adjustable threshold.

The unit shown in FIG. 11 can be placed at either main line or both main lines (left and right), such that the water pressure is not reduced at the end of the feeder line but somewhere in the middle of the feeder line. As another option, the unit of FIG. 11 can be at both main lines and used together with any kind of controllable valves, and in this manner, create different kinds of segments.

Figure 11A:
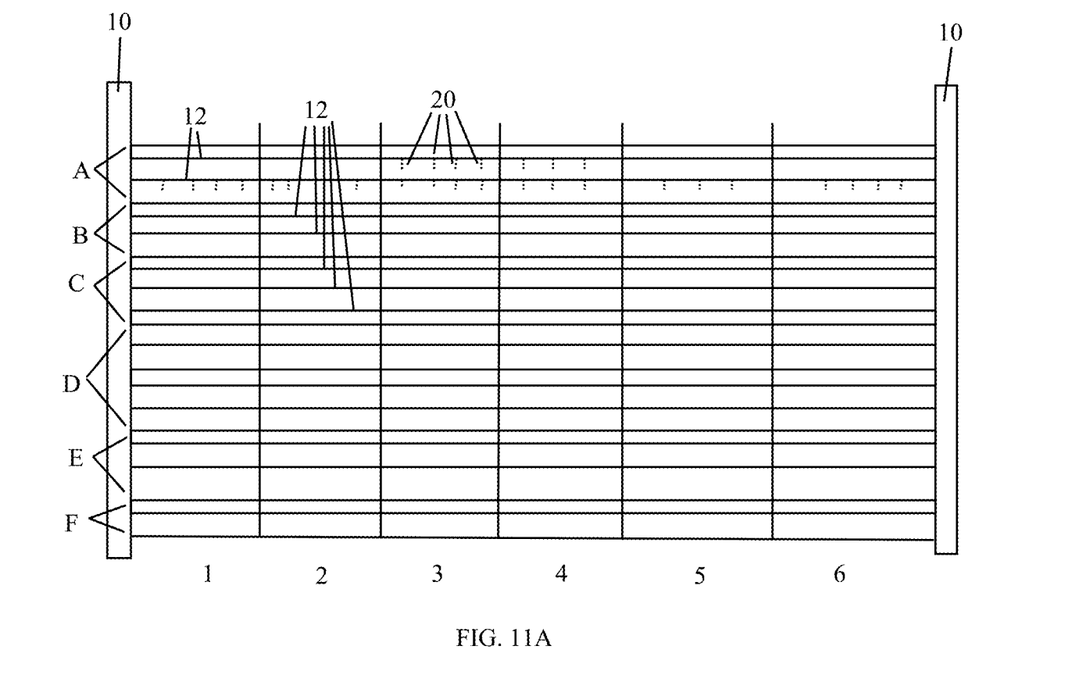
FIG. 11A is a simplified illustration of an embodiment of the invention which allows choosing any segment in a given row to be provided with water and choosing any segment in a given row not to be provided with water.

Reference is now made to FIG. 11A. In the previous embodiments, each segment is provided with one or more drippers. This means every segment, starting from the one closest to the main line and every subsequent segment will be irrigated upon opening that main line at a sufficient pressure. This means it is not possible to skip the closest segment and not provide it with any water and then provide inner segments of that feeder line row with water.

In the embodiment of FIG. 11A, it is possible to choose any segment in a given row to be provided with water and choose any segment in a given row not to be provided with water. This may be accomplished by providing more than one feeder line per row and providing drippers not at every segment on a given feeder line on that same row.

For example, in the illustrated field there are 6 rows A-F and 6 columns 1-6, such that there are 36 segments A1, A2, ... A6. B1, B2, ... B6, C1, C2, ... C6, etc. Row A has two feeder lines; row B, 2 feeder lines; row C, 3 feeder lines; row D, 4 feeder lines, row E, 2 feeder lines, and row F, 1 feeder line. (Of course, this is exemplary and the invention is not limited to this; this example shows that any mix of feeder lines can be used for better or worse resolution and also shows that the embodiment can also include one or more rows (in this case row F) that are like the previous embodiments.)

In row A, in the upper feeder line, no drippers are located in segments A1 and A2, whereas in the lower feeder line, drippers are located in every segment. If it is desired that segments A1 and A2 should not receive any water, then water may be provided from the left main line 10 to the upper feeder line alone with no water being provided to the lower feeder line of row A. In this manner, water will skip segments A1 and A2 and only go to segments A3 and A4 (and if sufficient pressure is provided, to other segments to the right of A3 and A4.) If it is desired to irrigate segments A1 and A2, then water may be provided from the left main line 10 to the lower feeder line of row A which does have drippers in segments A1 and A2. It is appreciated that in this manner, any desired pattern, such as a checkerboard pattern or irregular patterns, can be irrigated with combinations of water provided from the left and right main lines to different feeder lines in the rows.

Reference is now made to FIGS. 12A-12H, which illustrate using the drip irrigation system to irrigate segments (pixels) in a field, such as with no-drip emitters, in accordance with non-limiting embodiments of the present invention.

Figure 12A:
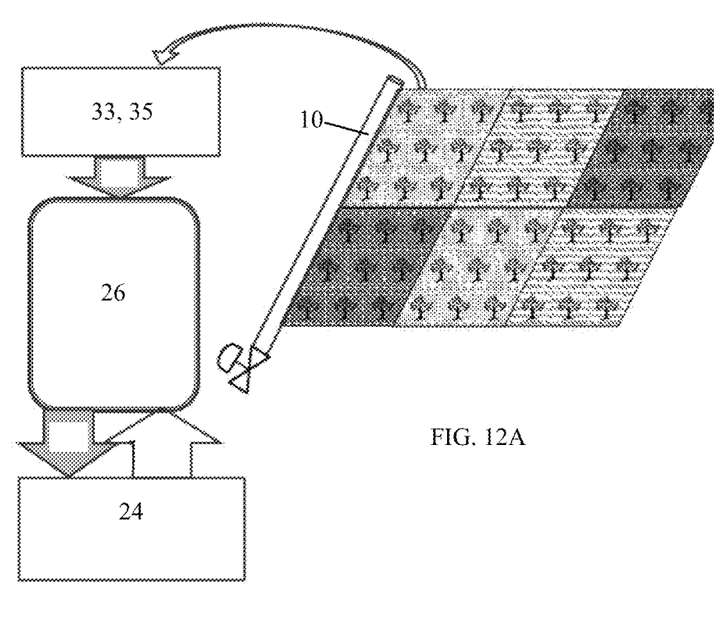
FIGS. 12A-12H are simplified pictorial illustrations of using the drip irrigation system to irrigate segments (pixels) in a field, such as with no-drip emitters, in accordance with non-limiting embodiments of the present invention.

FIG. 12A shows the field in communication with the main line 10 which is in communication with the gateway 26, agronomic decision system 24, pressure regulator and valve unit 33 and command modules 35, as described above. The system may receive a daily irrigation plan for each pixel from the agronomic decision system 24 and store it in the gateway 26. The system may process the daily irrigation plan for each pixel into a pressure plan for each segment and each controllable pressure regulator.

Figure 12B:
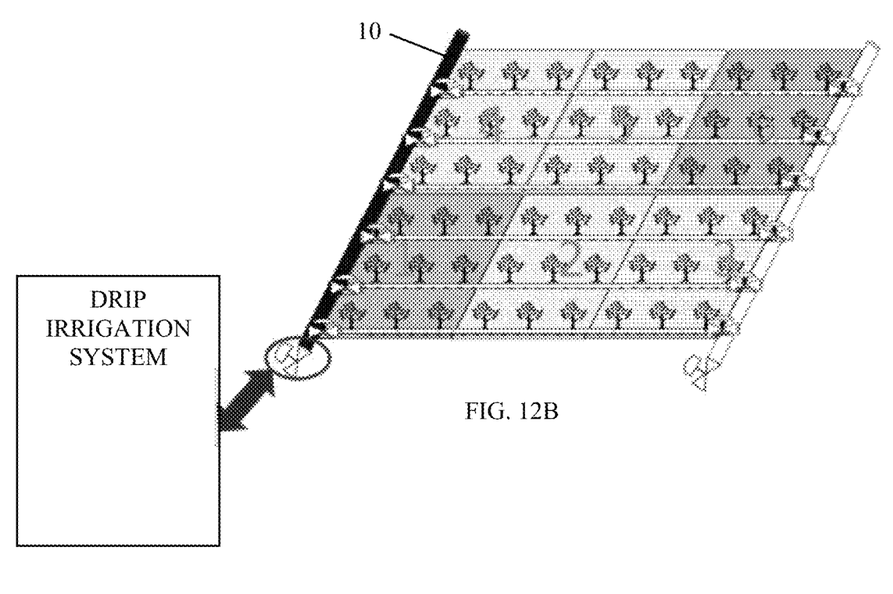

In FIG. 12B, the system causes water to flow to the left main line 10.

Figure 12C:
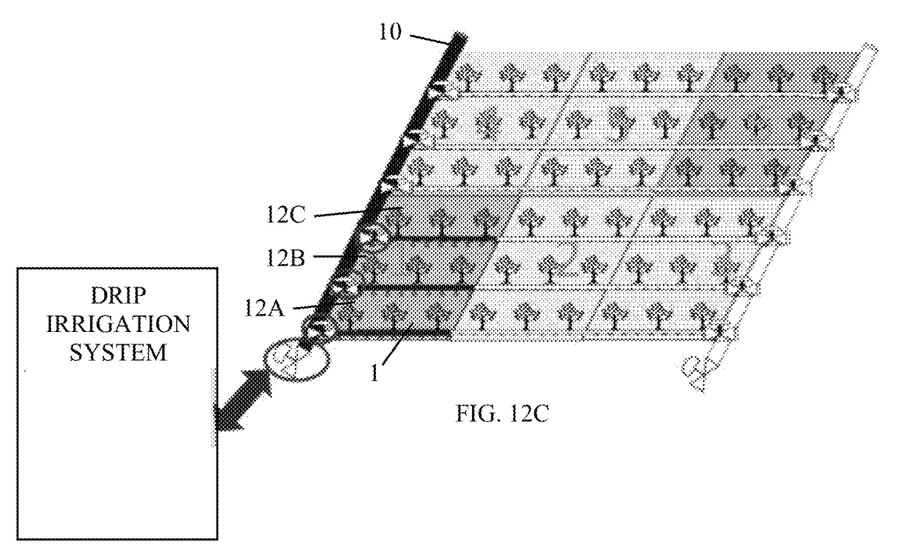

In FIG. 12C, water flows from the left main line 10 to the first segment (leftmost pixel) of feeder lines 12A, 12B and 12C for a certain time by giving pressure commands to its regulators. The regulator may increase the pressure (while sensing feedback by flow or pressure) until a desired pressure is reached.

Figure 12D:
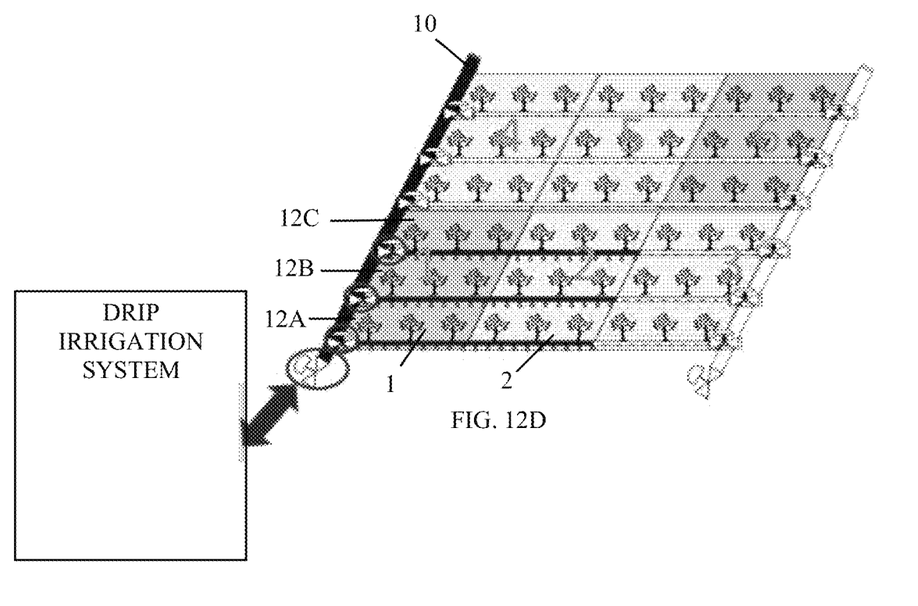

In FIG. 12D, the process of FIG. 12C is repeated for a second pixel (along with the first pixel) for each of feeder lines 12A, 12B and 12C for another duration of time, by giving a different pressure command and using feedback until a desired pressure is reached.

Figure 12E:
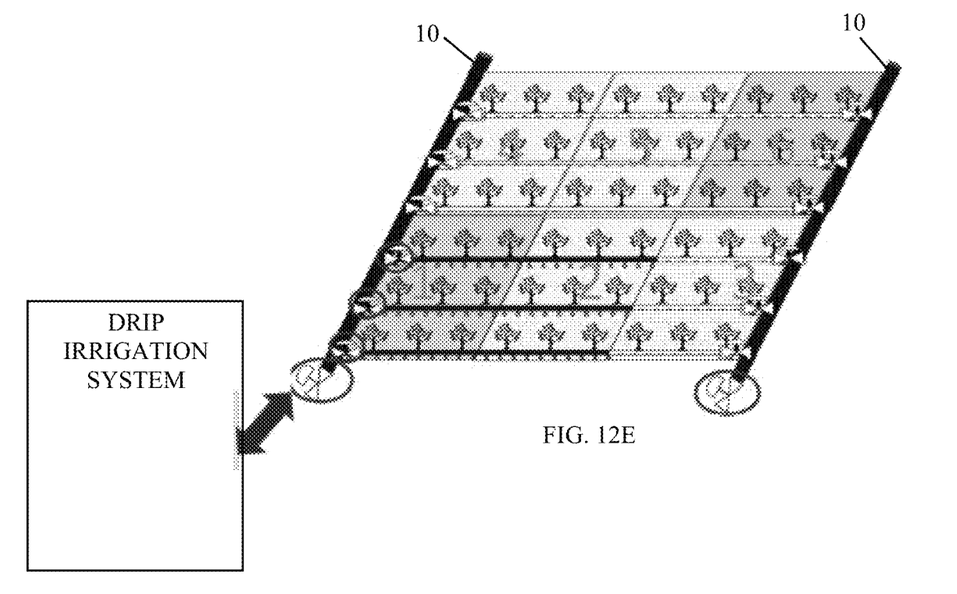

In FIG. 12E, the system causes water to flow to the right main line 10.

Figure 12F:
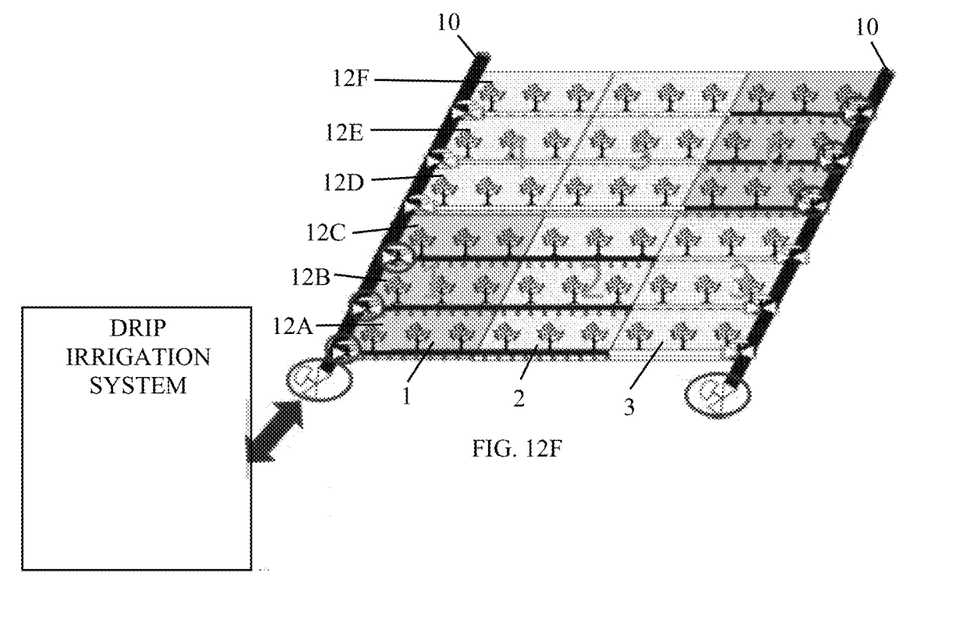

In FIG. 12F, water flows from the right main line 10 to the rightmost segment of other feeder lines 12D, 12E and 12F, for another duration of time, by giving pressure commands to its regulators. The regulator may increase the pressure (while sensing feedback by flow or pressure) until a desired pressure is reached. It is noted that the leftmost pixels 1 and 2 are still open for feeder lines 12A, 12B and 12C.

Figure 12G:
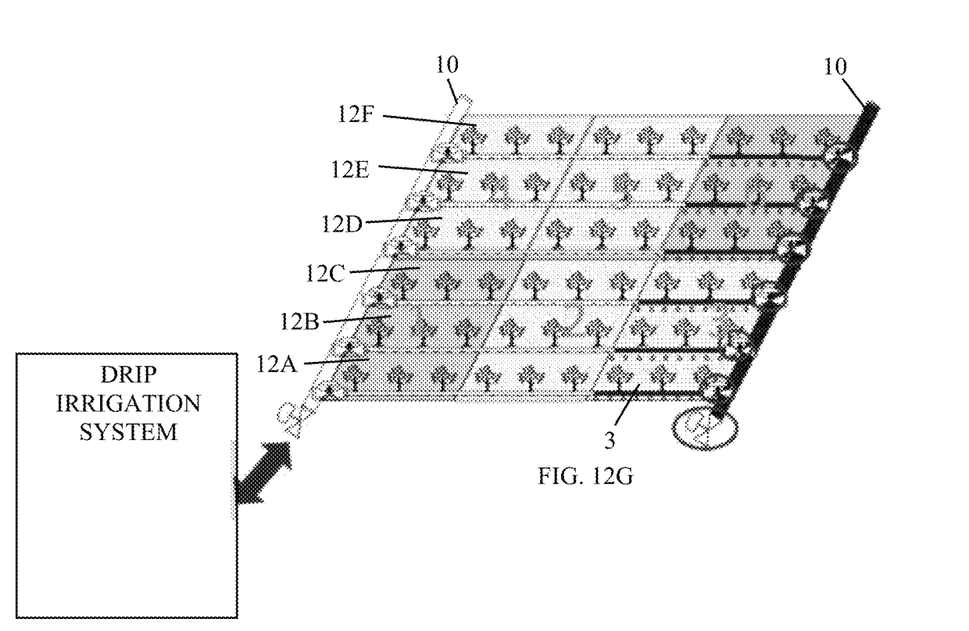

In FIG. 12G, the water is closed from the left main line 10 to the pixels 1 and 2 of feeder lines 12A, 12B and 12C by closing their valves and resetting their regulators, and/or by shutting off water flow to the left main line 10. Water continues to flow to feeder lines 12D, 12E and 12F from right main line 10. Water flows from the right main line 10 to the rightmost segments of feeder lines 12A, 12B and 12C, for another duration of time, by giving pressure commands to its regulators. The regulator may increase the pressure (while sensing feedback by flow or pressure) until a desired pressure is reached.

Figure 12H:
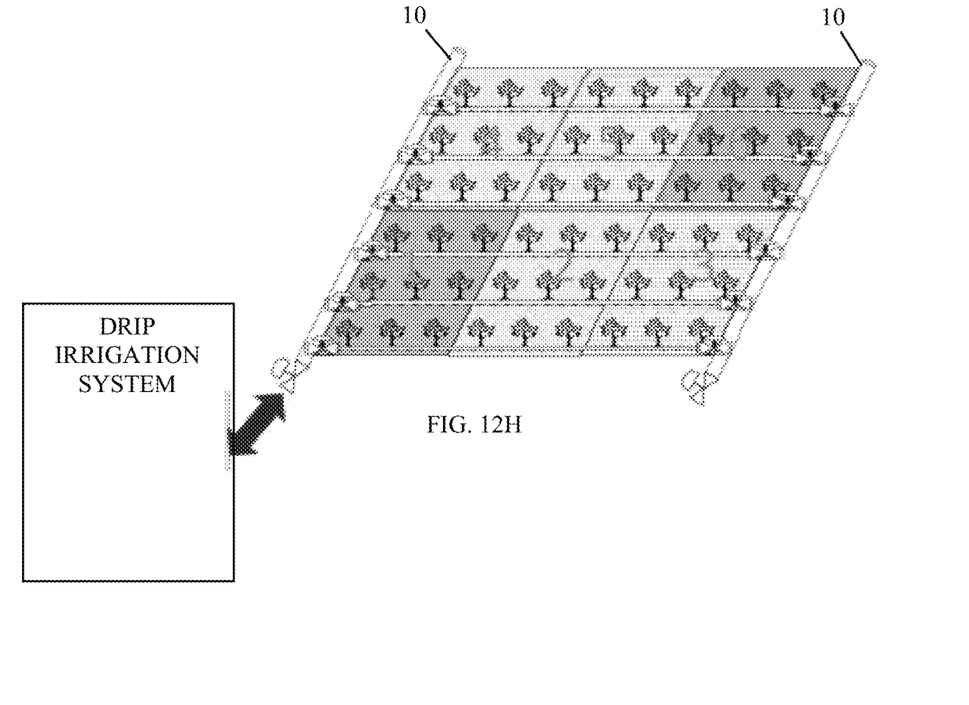

In FIG. 12H, irrigation is ended by closing water to both left and right main lines and resetting all pressure regulators.

The same process described with reference to FIGS. 12A-12H may also be used for feeder lines equipped with low pressure operable valves (unidirectional and bidirectional) and lateral pressure operable valve manifolds or manifolds coupled to any kind of dripper. A unidirectional valve opens to pressure only from one direction (either the left main line or the right; not both. A bidirectional valve opens to pressure from two directions, either the left main line or the right main line. A manifold can be coupled on one side to one of the main lines and on its other side to more than one feeder line.

Figure 13A:
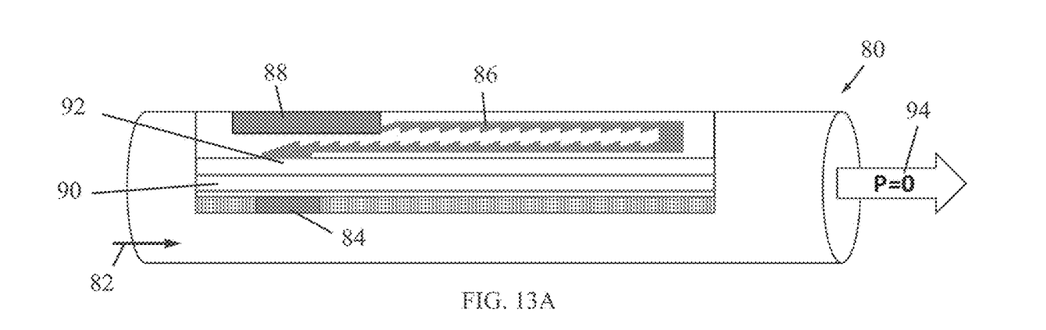
FIGS. 13A, 13B and 13C are simplified illustrations of a dripper that closes when liquid pressure reaches an upper threshold, in accordance with an embodiment of the invention.
Figure 13B:
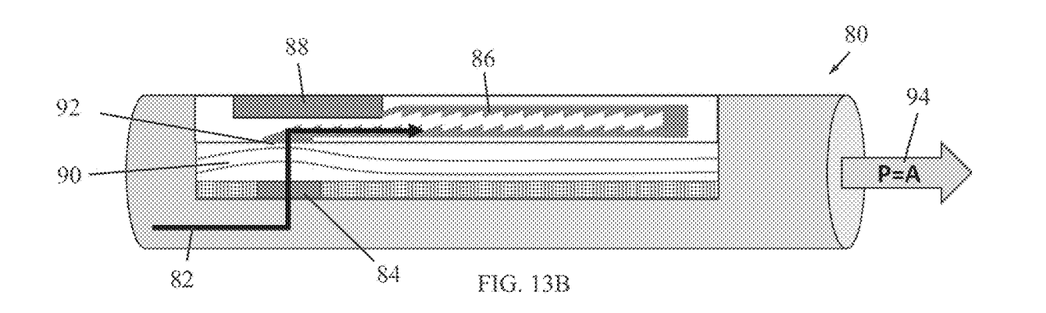
Figure 13C:
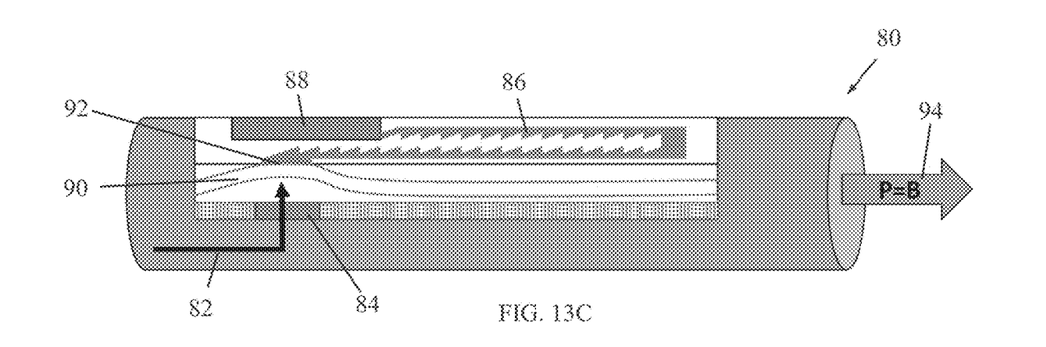

Reference is now made to FIGS. 13A, 13B and 13C, which illustrate a dripper 80 that closes when liquid pressure reaches an upper threshold, in accordance with an embodiment of the invention.

Dripper 80 may include a water inlet 82, an optional inlet filter 84, an optional water path labyrinth 86 and a drip outlet 88. Dripper 80 also includes a high pressure shut-off element 90, such as a membrane that can close against an opening 92 that leads to the dripper outlet 88 (or water path labyrinth 86, if the dripper includes a labyrinth).

FIG. 13A shows dripper 80 with no water flow. As seen in FIG. 13B, when water is supplied at a pressure below the cutoff threshold, flows into water inlet 82, flows around shut-off element 90 and enters opening 92 to flow through labyrinth 86 and exit dripper outlet 88. In FIG. 13C, the water has reached the high pressure cutoff threshold. This pressure causes the water to push shut-off element 90 against opening 92, thereby sealing opening 92 and preventing any water from flowing to labyrinth 86 and dripper outlet 88.

Dripper 80 may have a water outlet 94 for fluid connection to a neighboring dripper or pipe. Thus, even if water is shut off to the dripper outlet 88, water can continue to flow to the next dripper element, no matter what kind of dripper element is the next one.

In this manner, by installing such a high-pressure cutoff dripper, one can selectively cut off flow of water to a particular segment while allowing water to flow to the next segment.

What is claimed is:

1. A method for drip irrigation comprising:
   providing water from a first main line to at least one feeder line, said at least one feeder line extending along a plurality of segments in a field, including a first end segment nearest said first main line and an adjacent segment which is adjacent to said first end segment further away from said main line;

at least one dripper disposed on said at least one feeder line; and wherein water is delivered by a first pressure from said first main line to said first end segment, said first pressure being insufficient to deliver water from said first main line to said adjacent segment, and wherein water is delivered by a second pressure from said first main line to said first end segment and to said adjacent segment wherein said second pressure is greater than said first pressure.

2. The method according to claim 1, wherein said at least one dripper is disposed on said at least one feeder line for each of said segments.

3. The method according to claim 1, comprising a plurality of adjacent segments starting from said adjacent segment which is adjacent to said first end segment, the plurality of adjacent segments being progressively further away from said main line and ending in a second end segment which is at an end of said at least one feeder line opposite to said first main line.

4. The method according to claim 3, comprising a second main line, wherein the method comprises providing water from said second main line to said second end segment at a third pressure.

5. The method according to claim 4, comprising providing water from said second main line to said second end segment and to a segment located between said first end segment and said second end segment at a fourth pressure which is greater than said third pressure.

6. The method according to claim 5, comprising simultaneously providing water from said first main line to said segment which is located between said first end segment and said second end segment.

7. The method according to claim 1, comprising using a plan to send commands of pressure or time to a pressure regulator to regulate pressure of water delivered by said first main line to said at least one feeder line in accordance with pressure or time.

8. The method according to claim 1, comprising controlling segment irrigation according to different pressure patterns.

9. The method according to claim 1, comprising providing fault or error sensing or warning of a problem with position of the problem.

10. The method according to claim 1, comprising using at least one of water flow, pressure patterns and flow changes as an indication of irrigation of said segments.

11. The method according to claim 1, comprising using feedback related to changes in patterns of flow throughput and pressure fluctuations to control irrigation of said segments.

12. The method according to claim 1, further comprising using a pressure operated valve to control flow to at least one of said segments.

13. The method according to claim 1, using a unidirectional valve to control flow to at least one of said segments, wherein said unidirectional valve opens in response to pressure from one direction only.

14. The method according to claim 1, using a bidirectional valve to control flow to at least one of said segments, wherein said bidirectional valve opens in response to pressure from two opposing directions.

15. The method according to claim 1, using a manifold to control flow to at least one of said segments, said manifold being coupled on one side to said first main line and on another side to more than one feeder line.

16. The method according to claim 1, comprising providing more than one feeder line on a row of an area to be irrigated, and providing said at least one dripper not at every segment on one of said feeder lines on said row.

17. The method according to claim 1, wherein said dripper comprises a high pressure shut-off element that closes a drip outlet of said dripper when liquid pressure reaches an upper threshold.

\* \* \* \* \*